United States Patent
Basavaraj et al.

(10) Patent No.: US 9,408,078 B2
(45) Date of Patent: Aug. 2, 2016

(54) IP MOBILITY SECURITY CONTROL

(75) Inventors: Patil Basavaraj, Coppell, TX (US);
Teemu Ilmari Savolainen, Nokia (FI);
Bajko Gabor, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 201 days.

(21) Appl. No.: 12/642,230

(22) Filed: Dec. 18, 2009

(65) Prior Publication Data
US 2011/0154432 A1    Jun. 23, 2011

(51) Int. Cl.
| | |
|---|---|
| *H04L 29/06* | (2006.01) |
| *H04L 9/00* | (2006.01) |
| *H04W 12/08* | (2009.01) |
| *H04W 36/00* | (2009.01) |
| *H04W 12/02* | (2009.01) |
| *H04W 60/04* | (2009.01) |
| *H04W 80/04* | (2009.01) |

(52) U.S. Cl.
CPC .......... *H04W 12/08* (2013.01); *H04L 63/105* (2013.01); *G06F 2221/2105* (2013.01); *G06F 2221/2141* (2013.01); *H04L 63/0428* (2013.01); *H04L 63/166* (2013.01); *H04L 69/24* (2013.01); *H04W 12/02* (2013.01); *H04W 60/04* (2013.01); *H04W 80/04* (2013.01)

(58) Field of Classification Search
CPC . H04L 63/105; H04L 63/164; H04L 63/0272; H04L 69/24; H04L 63/08; H04L 63/166; H04L 63/0428; H04W 63/08; H04W 60/04; H04W 80/04; H04W 12/06; H04W 8/26; H04W 12/02; H04W 12/08; H04W 60/00
USPC .............................................. 380/270; 726/1
See application file for complete search history.

(56) References Cited

U.S. PATENT DOCUMENTS

| | | | | |
|---|---|---|---|---|
| 6,170,057 | B1 | 1/2001 | Inoue et al. | |
| 6,889,328 | B1 * | 5/2005 | Sanchez Herrero | .... H04L 63/08 713/151 |
| 7,461,398 | B2 * | 12/2008 | Aaron | .............................. 726/6 |
| 7,680,123 | B2 * | 3/2010 | Veerepalli | ............. H04W 80/04 370/395.3 |
| 7,940,722 | B1 * | 5/2011 | Rosenberg | ........... G06Q 20/102 370/328 |
| 2003/0097590 | A1 * | 5/2003 | Syvanne | ....................... 713/201 |

(Continued)

FOREIGN PATENT DOCUMENTS

| | | |
|---|---|---|
| EP | 1 458 132 A2 | 9/2004 |
| EP | 2007097 A1 | 12/2008 |
| WO | WO-2008/149326 A2 | 12/2008 |

OTHER PUBLICATIONS

Korhonen, J. et al. "Security architecture for Mobile IPv6 using TLS, draft-korhonen-mext-mip6-altsec-02.txt", Oct. 2009.*

(Continued)

*Primary Examiner* — Michael Simitoski
(74) *Attorney, Agent, or Firm* — Alston & Bird LLP (57) ABSTRACT

A method, apparatus, and computer program product are provided for adapting security level between a mobile node and a mobility anchor. In the context of a method, an IP mobility binding with an indication of a security mode is established for a mobile node connected to an IP sub-network and identified in the IP sub-network by a care of address. A trigger to adapt the security mode for the mobile node connected to the IP sub-network is detected. The security mode for the mobile mode connected to the IP sub-network and identified by the care of address is adapted in response to the trigger.

23 Claims, 6 Drawing Sheets

(56) References Cited

U.S. PATENT DOCUMENTS

| | | | |
|---|---|---|---|
| 2004/0198220 A1* | 10/2004 | Whelan et al. | 455/41.1 |
| 2004/0198319 A1* | 10/2004 | Whelan et al. | 455/411 |
| 2005/0028011 A1 | 2/2005 | Motoyoshi et al. | |
| 2005/0055578 A1* | 3/2005 | Wright et al. | 713/201 |
| 2005/0129032 A1* | 6/2005 | Kim et al. | 370/400 |
| 2006/0270446 A1* | 11/2006 | Ikeda | H04W 8/065 455/552.1 |
| 2007/0006295 A1* | 1/2007 | Haverinen et al. | 726/14 |
| 2007/0086382 A1* | 4/2007 | Narayanan et al. | 370/331 |
| 2007/0217381 A1* | 9/2007 | Williams | H04W 8/08 370/338 |
| 2008/0043758 A1* | 2/2008 | Giaretta et al. | 370/400 |
| 2008/0159227 A1* | 7/2008 | Ulupinar et al. | 370/331 |
| 2008/0225793 A1* | 9/2008 | Wang et al. | 370/331 |
| 2008/0285518 A1* | 11/2008 | Dutta et al. | 370/331 |
| 2010/0215019 A1* | 8/2010 | Velev et al. | 370/331 |
| 2011/0026435 A1* | 2/2011 | Weniger | H04W 8/065 370/254 |

OTHER PUBLICATIONS

International Search Report and Written Opinion for International Appl. No. PCT/FI2010/050837, mailed Feb. 17, 2011.
*IP Mobility Support for IPv4*, RFC3344, C. Perkins, Ed., Aug. 2002, 89 pages.
Devarapalli, V. et al., *Network Mobility (NEMO) Basic Support Protocol*, RFC3963, Jan. 2005, 67 pages.
*Proxy Mobile IPv6*, RFC5213, S. Gundavelli, Ed., Aug. 2008, 185 pages.
Johnson, D. et al., *Mobility Support in IPv6*, RFC3775, Jun. 2004, 147 pages.
*Mobile IPv6 Support for Dual Stack Hosts and Routers*, H. Soliman, Ed., RFC5555, Jun. 2009, 83 pages.
Winterbottom, J. et al., *GEOPRIV Presence Information Data Format Location Object (PIDF-LO) Usage Clarification, Considerations, and Recommendations*, RFC5491, Mar. 2009, 25 pages.
Schulzrinne, H., *Dynamic Host Configuration Protocol (DHCPv4 and DHCPv6) Option for Civic Addresses Configuration Information*, RFC4776, Nov. 2006, 17 pages.
Vaarala, S. et al., *Mobile IPv4 Traversal Across IPsec-Based VPN Gateways*, RFC5265, Jun. 2008, 35 pages.
International Search Report for Application No. PCT/FI2012050837, dated Apr. 11, 2013.
Office Action for Chinese Application No. 201080057422.2 dated Mar. 5, 2014.
Office Action for Chinese Application No. 201080057422.2 dated Oct. 24, 2014.
Office Action from Chinese Patent Application No. 201080057422.2 dated May 7, 2015.
Extended European Search Report from European Patent Application No. 10837096.6 dated Apr. 11, 2013.
Office Action from corresponding Chinese Patent Application No. 201080057422.2 dated Mar. 14, 2016.

* cited by examiner

IP MOBILITY SECURITY CONTROL

FIELD

Embodiments of the invention relate to IP mobility, and in particular to controlling security procedures in IP mobility systems.

BACKGROUND

Nowadays terminal devices are highly mobile and can change their point of attachment to the Internet at any time, also during active network connections. Mobile IP protocols, defined both for IP version 6 (IPv6) and for IP version 4 (IPv4), allow mobile nodes (MN) to change their access point to the Internet without changing their IP address. Mobile IP defines a system for routing data of a mobile node to the current location of the node. This is accomplished through the use of a home agent (HA) that monitors the permanent IP address and current location of the mobile node. The home agent allows the mobile node to have a permanent address that is translated by the home agent into the mobile node's current address.

Some access networks the mobile devices use to access services are considered "insecure" accesses, while some other access networks are considered "secure" accesses. An example of an insecure access network could be a public WLAN hot-spot providing access to operator services over a public network (e.g. Internet). An example of a secure access network could be a general packet radio service (GPRS) network with layer 2 encryption enabled. Internet protocol security architecture (IPSec) is specified in a set of Internet Engineering Task Force (IETF) requests for comments (RFC) and is widely used to provide secure transmission of IP packets in various configurations. IPSec may be applied between the MN and the HA to provide an encrypted Mobile IP tunnel.

When switching across secure and insecure access networks the MN should dynamically switch encryption on or off according to the security policies. The MN may be configured, upon detecting a change of an IP sub-network by the MN, detect security requirements of the new IP sub-network, and adapt security associations of the MN to the security requirements of the new IP sub-network.

BRIEF DESCRIPTION

A method, apparatuses, and a computer program product are now provided, which are characterized by what is stated in the independent claims. Some embodiments of the invention are described in the dependent claims.

According to an embodiment of the invention, there is provided a method, comprising: causing establishment of an IP mobility binding with an indication of a security mode for a mobile node connected to an IP sub-network and identified in the IP sub-network by a care of address, detecting a trigger to adapt the security mode for the mobile node connected to the IP sub-network, and adapting, in response to the trigger, the security mode for the mobile node connected to the IP sub-network and identified by the care of address.

According to an embodiment of the invention, there is provided an apparatus, comprising at least one processor, at least one memory comprising computer program code, the at least one memory and the computer program code are configured, with the at least one processor of the apparatus, to cause the apparatus at least to perform: cause establishment of an IP mobility binding with an indication of a security mode for a mobile node connected to an IP sub-network and identified in the IP sub-network by a care of address, detect a trigger to adapt the security mode for the mobile node connected to the IP sub-network, and adapt, in response to the trigger, the security mode for the mobile node connected to the IP sub-network and identified by the care of address.

According to another embodiment, there is provided an apparatus comprising: means for causing establishment of an IP mobility binding with an indication of a security mode for a mobile node connected to an IP sub-network and identified in the IP sub-network by a care of address, means for detecting a trigger to adapt the security mode for the mobile node connected to the IP sub-network, and means for adapting, in response to the trigger, the security mode for the mobile node connected to the IP sub-network and identified by the care of address.

The invention and various embodiments of the invention provide several advantages, which will become apparent from the detailed description below.

LIST OF DRAWINGS

Embodiments of the present invention are described below, by way of example only, with reference to the accompanying drawings, in which.

DESCRIPTION OF EMBODIMENTS

Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Some embodiments will be illustrated in the following with reference to the simplified communications system and entities of FIG. 1. However, the application of the presently disclosed features is not limited to any particular network configuration but the present embodiments can be applied to any communication system where security between a mobile node and an entity communicating with the mobile node by applying IP mobility may be selectively enforced. The term "mobile node" is to be broadly understood to refer to various kinds of nodes with capability of changing between access networks, without limiting to mobile nodes supporting the current Mobile IP protocols, for instance.

A mobile node (MN) 10 may connect to various network resources via one or more access networks 20, 22, 24. For instance, such access network could be a (wireless) local access network connected an Internet access gateway and to the Internet. Another example is a private access network, such as a wireless company LAN connected to a company intranet. Some examples of WLANs include networks in accordance with some of the IEEE WLAN specifications, such as the 802.11 family. A still further example of an access network is a WIMAX network according to the IEEE 802.16 specifications.

The MN 10 is typically capable of establishing IP connections over an access network with a plurality of network attachment points, such as base stations 26. For instance, the access network 20 could be a GSM access network (Base Station Sub-system BSS), a Wideband Code Division Multiple Access (WCDMA) access network, and/or an Evolved UMTS Radio Access Network (E-UTRAN), standardized by the Third Generation Partnership Project (3GPP). It is to be noted that also non-cellular access networks, such as WIFI networks and WIMAX networks, may be provided with a plurality of access points.

Access networks 20, 22 are connected to further network elements 50, typically to an operator's core network. For instance, such core network may a GSM/GPRS core network or a Long Term Evolution (LTE) core network standardized by the 3GPP, which may also be referred to as a 3GPP core network or a UMTS core network. Some other examples of such access networks include radio access networks and core networks of the Third Generation Partnership Project Two (3GPP2), such as CDMA1x and Evolution Data Optimized (EV-DO) networks. The MN 10 may be capable of being connected to one or more access networks 20, 22, 24 simultaneously.

An IP mobility protocol, such as the Mobile IP version 6 (MIP6) as specified in IETF specification RFC3775 or Mobile IP version 4 (MIP4) as defined in RFC 3344, is applied to support mobility of IP connections for the MN 10. The system comprises one or more IP mobility anchors, in the present disclosed embodiments home agents (HA) 30 to hide the mobility of the MN 10 by establishing binding between the home address of the MN and a current care-of address (CoA) of the MN obtained from the currently visited access network 22. A tunnel 90 may be formed to the CoA for transmitting packets from a correspondent node CN 80, connected to the network 60, for instance, destined to the home address of the MN. The correspondent node 80 may be mobile or stationary.

Figure 1:
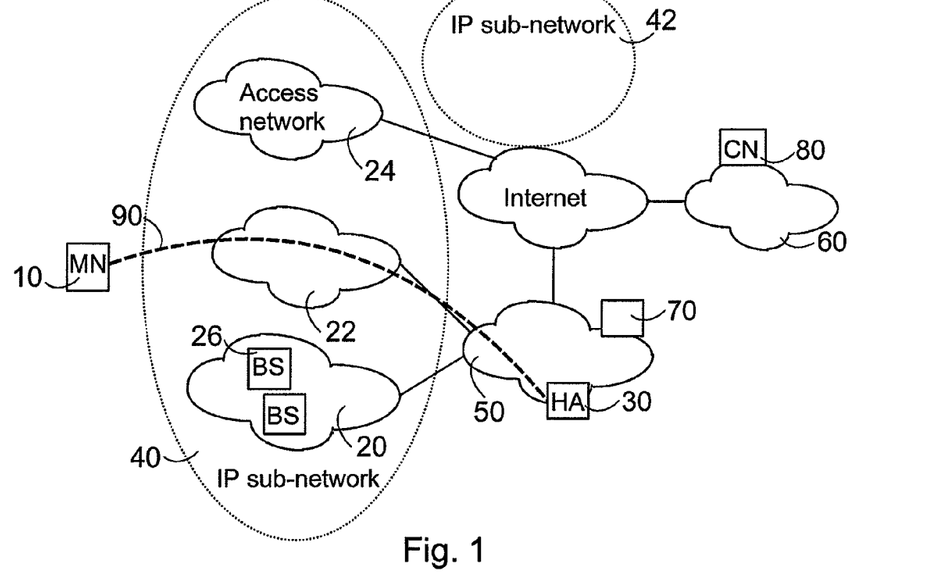
FIG. 1 illustrates an IP communications system.

In FIG. 1 the HA 30 is illustrated to be in connection of the network 50, but it will be appreciated that there could be more than one HA serving the MN 10 and the HA 30 could locate in another network, such as the network 60 connected to the Internet, for instance. In case of MIP4, a foreign agent would be provided in the access network 20, 22, 24 or co-located in a terminal hosting MIP mobile node features, but in MIP6 no specific foreign agents are provided in access networks.

Some further IP mobility protocols, which may be applied in connection with the presently disclosed features, include the Dual-Stack Mobile IPv6 (DSMIP6) protocol specified in RFC5555 and the Network Mobility (NEMO) protocol specified in RFC 3963. DSMIP6 extends Mobile IPv6 capabilities to allow mobile nodes with dual stacks to request their home agent (also dual-stacked) to tunnel IPv4/IPv6 packets addressed to their home addresses, as well as IPv4/IPv6 care-of address(es). The NEMO protocol is an extension for MIPv6 allowing every node in a mobile network to be reachable while moving. Hence, application of the features illustrated below for the MN 10 is not limited to terminal devices, but at least some of the features may be applied also for other types of nodes of a mobile network, which may have routing capabilities. In the following description further embodiments are illustrated mainly with reference to MIPv6, but it will be appreciated that the procedures may be applied in other current or future IP mobility systems. Thus, also the term "care of address" is to be broadly understood to refer to any kind of address used for mobility binding for addressing a mobile node when the mobile node is outside of its home network, without limiting to the care of addresses of MIPv4 or MIPv6.

Mobile IP based traffic, at least user plane traffic between the MN 10 and the HA 30 may be secured. There are at least two security modes, one of which is selected by the MN 10 and the HA 30 when initiating user plane data transmission. In one embodiment IPSec procedures are applied but the present features are not limited to use of any specific security protocol and encryption means. Hence, the term "security mode" is to be understood to broadly cover any kind of mode determining the security level between the communicating entities. The security mode for the mobile node refers to a security mode applied at least for data transmission to the mobile node. Such IP mobility based data transfer may be arranged between a home agent and the mobile node, or between the mobile node and another node utilizing IP mobility binding, such as a correspondent node capable of supporting care of address registration for the mobile node.

An IP mobility binding, referring generally to an association between a care of address and a home address of a mobile node, is provided with an indication of a security mode. This refers to generally setting the security mode for the binding. Data transfer associated with the binding may then be secured in accordance with the security mode. Adaptation of a security mode may refer to adaptation of a security association (SA) applied between the HA 30 and the MN 10. In a very simple example there may be only two modes: encryption on and encryption off. This could also be referred to as a security association with NULL encryption and non-NULL encryption. However, it will be appreciated that there may be any number of security modes with varying security levels, for instance three, four or more security modes.

One or more IP-based access networks belong to an IP sub-network 40, 42. In case of Mobile IP, when the MN 10 moves from an IP sub-network to another, it obtains a new CoA from the new IP sub-network and informs the HA 30 about the CoA by sending a registration request (MIP4) or a binding update (MIP6) message with the new CoA. Some or all of the point of attachments 20, 22, 24, 26 within the IP sub-network 40 may support a data link layer, i.e. a layer two mobility protocol. An example of such protocol is the Mobile IP Proxy (PMIP) specified in RFC 5213. Thus, when the MN 10 moves between such points of attachment 20, 22, 24, 26 within the IP sub-network 40, the mobility binding of the MN 10 does not necessarily need to be updated. The mobility binding has to only be updated if the change in the point of attachment results in a new CoA.

The mobile node 10 may be configured to, upon detecting a change of an IP sub-network 40, 42 by the mobile node, detect security requirements of the new IP sub-network, and change security associations of the terminal to the security requirements of the new IP sub-network. However, an improved IP mobility security arrangement has now been developed in which a security mode for a mobile node may be adapted even if the mobile node does not change IP sub-network 40 and maintains its CoA. The adaptation of the security mode may refer to a change of the security mode or updating properties of a security mode being applied. Adaptation between security modes may mean upgrading or downgrading of cipher suites. Adaptation of the security mode may thus imply change of a security protocol, for instance. This enables to react to changing operating conditions of the mobile node and to automatically adapt the security level to meet the changed characteristics of an access link or security preferences.

The system may also comprise a policy server 70, such as an authentication, authorization, and accounting AAA server or an access network discovery and selection function ANDSF server, to provide further services in connection with the attachment to at least some of the access networks 20, 22, 24. The policy server 70 may be part of or connected to an operator's core network 50, but it will be appreciated that the policy server 70 may be arranged in various other ways and for communication with the MN 10 apparatus and/or the HA 30 apparatus.

It will be appreciated that various other entities and configurations may exist, and FIG. 1 merely illustrates some entities relevant for the present features. For instance, a virtual private network (VPN) connection between the MN 10 and a VPN gateway may be required for the MN 10 to connect an intranet via an insecure network.

Figure 2:
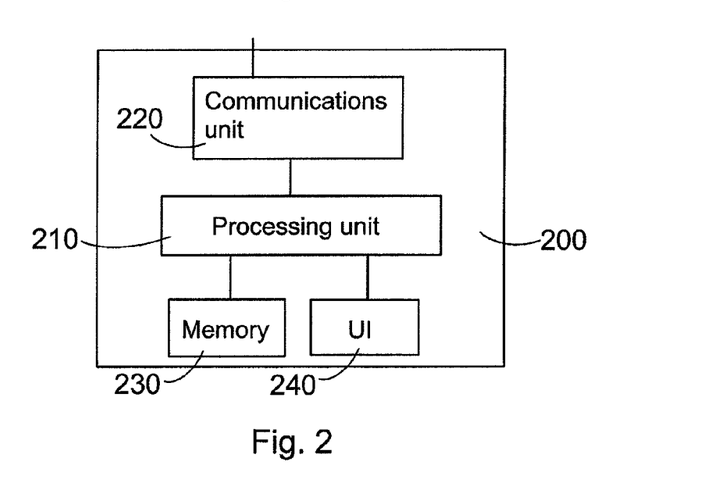
FIG. 2 illustrates an apparatus according to an embodiment.

FIG. 2 illustrates a simplified block diagram of an apparatus 200 according to an embodiment. The apparatus 200 comprises memory 230 and a processing unit 210 with one or more processors. The apparatus 200 also comprises one or more communications unit(s) 220, such as one or more transceivers for communicating with one or more of the above-identified networks. The apparatus may also comprise a user interface 240, such as a display and a keypad.

In one embodiment an apparatus, such as the apparatus 200, comprises a security mode manager configured to detect a trigger to adapt a security mode applied for a mobile node, such as the MN 10, connected to an IP sub-network and capable of being addressed by using an earlier assigned IP address for identifying the MN in the IP sub-network. Further, the security mode manager is configured to adapt the security mode of the mobile node in response to the trigger. The processing unit 210 may be adapted to carry out such security mode manager operations on the basis of security policy or configuration information from the memory 230 and information received via the communications unit 220. There may be a specific security policy store in the internal memory 230 of the apparatus 200, or the policy may be received from an external device.

The apparatus with the security mode manager may thus be implemented as an electronic digital computer. The processing unit 210 may be controlled by a sequence of program instructions transferred to the processing unit from the memory 230. An embodiment provides a computer program embodied on a computer-readable storage medium. Such computer program comprising one or more sequences of one or more instructions which, when executed by one or more processors of the apparatus, cause the apparatus to perform at least some of the security mode management related functions illustrated below in connection with FIGS. 3 to 13. The computer program may be stored on a carrier, which may be any entity or device capable of carrying the program.

In an embodiment such computer program code is stored in at least one memory 230 of the apparatus 200. The memory 230 and the computer program code are configured, with at least one processor of the apparatus 200, to provide means for and cause the apparatus 200 to perform at least some of the features illustrated below in connection with FIGS. 3 to 13. The computer program may be in source code form, object code form, or in some intermediate form. The security mode management features may be implemented as part of communications management software secure IP communications or part of operating system software, for instance.

The apparatus comprising the security mode manager could be in a form of a chip unit or some other kind of hardware module for controlling an IP communications device. The hardware module may form part of the device and could be removable. Some other examples of such hardware module include a sub-assembly or an accessory device.

At least some of the features of the apparatus illustrated further below could be implemented by one or more integrated circuits, such as application-specific integrated circuits ASIC. Other hardware embodiments are also feasible, such as a circuit built of separate logic components. A hybrid of these different implementations is also feasible.

Some further embodiments of features for the apparatus and the security mode manager, are illustrated below in connection with FIGS. 3 to 12. Although the apparatus 200 and the processing unit 210 are depicted as a single entity, different modules and memory may be implemented in one or more physical or logical entities. For instance, the security mode manager could comprise a specific functional module for carrying one or more of the steps in FIGS. 3 to 6. It should be appreciated that the apparatus may comprise other units, not discussed in more detail here.

The apparatus 200 may be any communications apparatus capable of supporting IP mobility. In one embodiment the apparatus 200 encompasses functions of the mobile node 10 and may comprise one or more radio units and at least one antenna for wireless communications with at least some of the access networks 20 to 24 identified above in connection with FIG. 1. In general, the various embodiments of the apparatus can include, but are not limited to, cellular telephones, personal digital assistants (PDAs), portable computers, imaging devices, gaming devices, music and/or video storage and playback appliances, Internet appliances permitting Internet access and browsing, as well as other portable units or terminals that incorporate mobile communications functions. The apparatus can be any kind of combination of such devices.

In another embodiment the apparatus 200 encompasses functions of the home agent 30. Thus, the apparatus may be a network server device or other appropriate network element configured to functions as a Mobile IP home agent.

Let us further study some embodiments on arranging further adaptation of security mode for a mobile node for which an IP mobility binding has been established. The procedures illustrated below in connection with FIGS. 3 to 6 may be applied by the apparatus 200. The apparatus may comprise a home agent, a mobile node, or a further node capable of registering a care of address of a mobile node, such as the HA 30, the MN 10 or the CN 80 illustrated in FIG. 1. The description concentrates, for simplicity reasons, mainly on embodiments involving a mobile node and a home agent, and in the following references are simply mainly made to the MN 10 and the HA 30.

Figure 3:
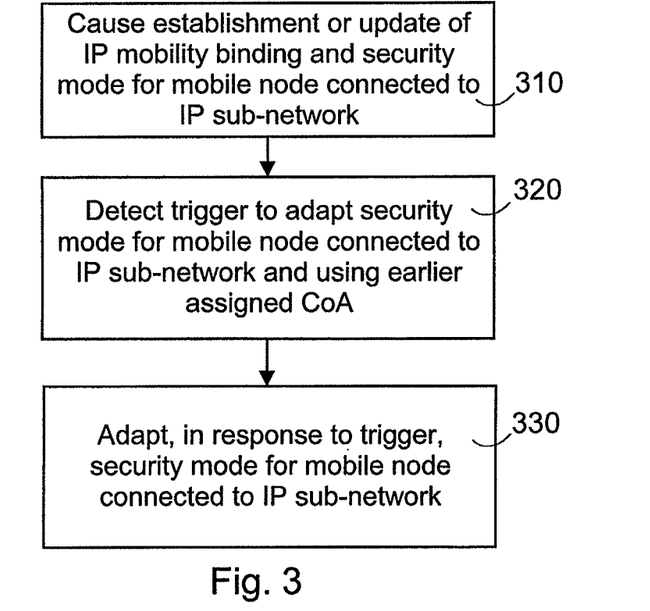
FIG. 3 illustrates a method according to an embodiment.

FIG. 3 illustrates main steps related establishing and adapting a security mode for a mobile node connected to an IP sub-network. In step 310 an IP mobility binding may be (caused to be) established or updated for a mobile node 10. It is to be noted that the MN 10 may be arranged to perform step 310, in which case the MN 10 may send a binding update message to trigger establishment of a mobility binding by the HA 30.

Step 310 is typically carried out in response to the MN 10 attaching to a new access network and obtaining a CoA for use in the visited IP sub-network 40. This step may be initiated in response to establishing a new IP connection for the MN in a foreign network, in response to an IP connection of the MN being handed over to a new IP sub-network 40, 42, or in response to the MN changing between an access network 20, 22, 24 or access point 26 such that a new CoA needs to be acquired and the mobility binding needs to be updated. An appropriate security mode is selected and enforced for the MN in step 310. This step may involve using mobile IP signalling to indicate the required security level between the MN 10 and the HA 30.

In step 320 a trigger to adapt the security mode for the MN 10 connected to the IP sub-network 320 and using the CoA earlier locally allocated for the MN is detected. In other words, although there is no need to update the mobility binding and the CoA, the change of the security mode applied between the MN 10 and the HA 30 may be triggered.

The security mode applied for the MN 10, connected to the IP sub-network and identified by the CoA, is adapted 330 in response to the trigger. In step 330 appropriate changes to the security functions applied between the MN 10 and the HA 30 are made. For instance, the security mode manager controls application of encryption for user plane traffic. Thus, there is provided a capability to trigger security for user plane traffic on a need basis even if the MN does not change IP sub-network and the CoA, i.e. in situations in which updating of the mobility binding would not have been triggered. This further enables resource savings, since data encryption can be applied only when necessitated by the current circumstances. There are many embodiments for detecting the need to adapt the security mode for the MN 10 continuing to be connected to the IP sub-network and using the earlier assigned CoA, some of which are further illustrated in connection with FIGS. 4 to 6.

Figure 4:
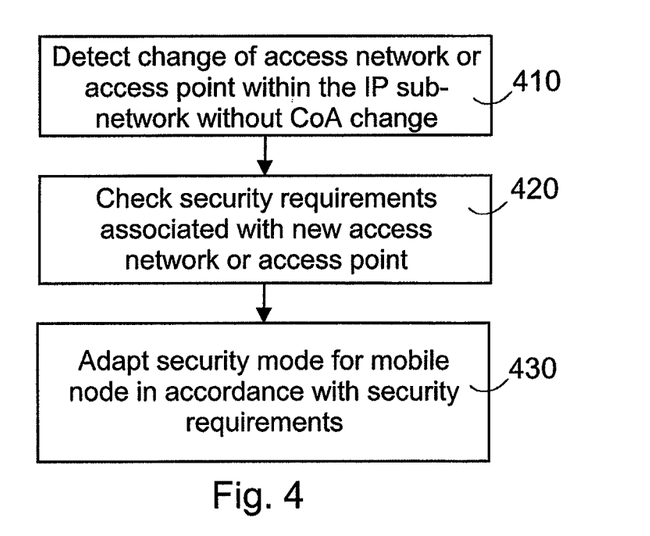
FIGS. 4 to 6 illustrate methods according to some further embodiments.

FIG. 4 illustrates a first embodiment which may be applied in steps 320 and 330 of FIG. 3. In step 410 a change of access network and/or an access point within the visited IP sub-network 40 not requiring the change of the CoA is detected. Security requirements associated with the new access network or access point are checked 420. If necessary, the security mode for the MN 10 is adapted 430 on the basis of the security requirements detected in step 420. Although not illustrated in FIG. 4, it may be the case that on the basis of check 420 there is no need to change the security mode. For instance, the MN may change between cellular radio access networks applying reliable lower-layer encryption.

The procedure of FIG. 4 is preferably carried out each time the MN 10 changes to a new access network 20 to 24 or access point 26 by applying a data link layer mobility protocol. The security mode manager may be arranged to perform the features of FIG. 4 in response to detecting such change of layer 2 point of attachment. For instance, the MN 10 may move between access points by applying procedures of the IEEE 802.11r specification. Some other examples of solutions, which may be applied for layer 2 mobility, include the PMIP or GPRS tunneling protocol (GTP) based solutions.

The procedure may in step 420 determine if the new access network is viewed as trusted or untrusted. This determination may be based on an identifier or an identifier type of new access network, for instance. As an example, a medium access control (MAC) address or WLAN service set identifier SSID provided by the access network 24 may be applied. If the new access network or access point is viewed as trusted or where encryption is not allowed, the procedure may select not to secure the user plane traffic. Thus, the MN-HA security mode may be dynamically adapted to increase security level in response to the MN 10 changing to an untrusted network without changing its IP address.

A static or dynamic security mode policy regarding one or more access networks or access points may be obtained at the time of network attachment. Such policy may be stored in a memory accessible by the MN 10 or the HA 30. For instance, such policy may be stored on a (UMTS) subscriber identification module (SIM) on an IC card inserted in the MN apparatus. In another example information about the access network is obtained on the basis of mechanisms specified in IEEE 802.21, specifying procedures facilitating media-independent handovers. A media-independent handover (MIH) function provides a media-independent information service, on the basis of which the MN 10 may be arranged to receive information on networks at given geographical area. In another example, a security mode policy may be obtained from a $3^{rd}$ party server, which provides security rating of access networks based on independent information, like abuse or incident reporting.

Figure 5:
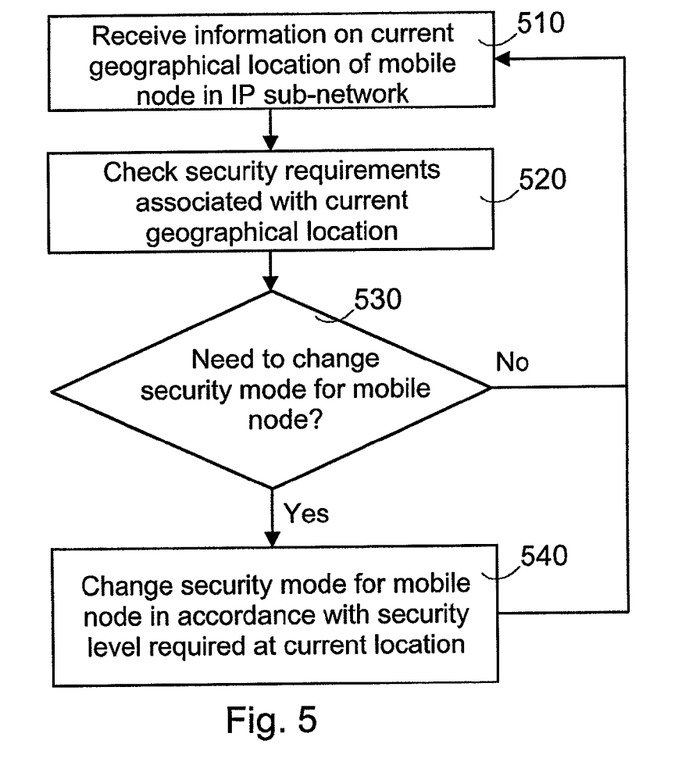

FIG. 5 illustrates a second embodiment which may be applied in steps 320 and 330 of FIG. 3. In step 510 information on current physical or logical location of the MN 10 in the IP sub-network 40 is received. This information may be created by a positioning unit in the MN, network-based positioning means, or by other means for defining location information regarding current location of the MN. The location information may include information on exact location or location area of the MN 10. For instance, location information by a Global Positioning System (GPS) receiver in the MN 10 may be applied, or location information about the CoA assigned to the MN can also be applied.

In step 520 security requirements associated with the current location are checked. This step may involve comparing the location information to a database storing security requirements for given geographical areas, for instance.

The embodiment of FIG. 5 illustrates a continuing procedure, in which a need to change the security mode between the MN and the HA is checked 530. If there is no need to change security mode on the basis of the current location of the MN 10, the procedure may proceed to wait for new location information and return to step 510. If, on the basis of the security requirements associated with the location of the MN 10, there is need to change the security mode, the security mode between the HA and the MN 10 is adapted in step 540 in accordance with the required security level or mode associated with the current location. This second embodiment enables to control the applied security level to meet requirements set for specific location, such as corporate premises, or when crossing country borders, for instance.

Figure 6:
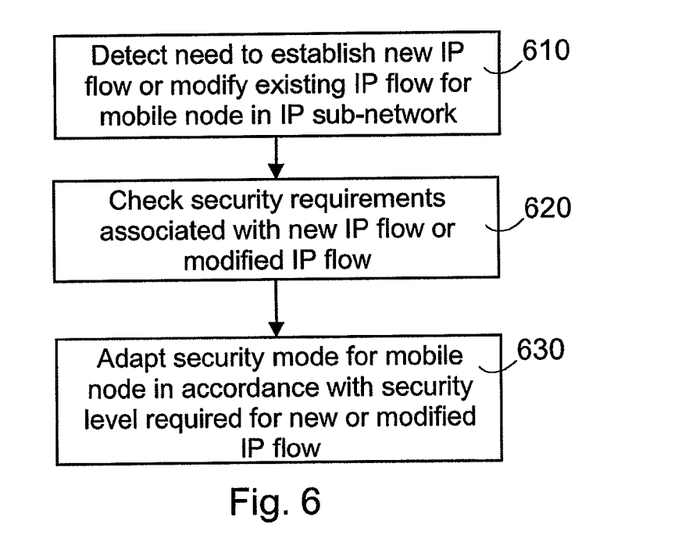

FIG. 6 illustrates a third embodiment which may be applied in steps 320 and 330 of FIG. 3. In step 610 a need to establish a new IP flow or modify an existing IP flow for the MN 10 in the IP sub-network is detected. Security requirements associated with the new or modified IP flow are checked 620. The security mode manager may be arranged to perform these steps on the basis of an indication from an application of the MN 10, for instance. If necessary, the security mode for the MN 10 is adapted 630 in accordance with the security level required for the new or modified IP flow.

The security mode manager may be arranged to detect in step 320, 620 the applied security mode on the basis of security procedure or mode applied by upper protocol layer(s). The security mode manager may detect that an upper protocol layer already applies reliable security procedures for the new or modified data flow, on the basis of which encryption may be set off in step 620. In a further example, if use of secure sockets layer (SSL) or transport layer security (TLS) protocol at transport layer is detected, the IPSEC procedures may be omitted. Using IPSEC to secure such flows would only enable limited benefits; The IPSEC would additionally enable to hide to whom the MN 10 is talking to via the HA 30, but the actual content of the flow would be already protected by the transport layer security procedures.

In one embodiment, the MN 10 may be provisioned with an IPv6 prefix rather than a unique IP address. The MN 10 may decide to use multiple addresses from the allocated prefix and register them with the HA 30. The MN can use some addresses to send data traffic encrypted, and some addresses to send data traffic unencrypted, even though it is connected to only one point of attachment. This allows the MN 10 to switch on/off security on a per flow basis.

Hence, the security mode may be selectively adapted 330, 630 for each logical IP flow of the MN 10. In MIPv6 and DSMIP the MN 10 may register multiple CoAs with the HA 30. The MN 10 has the ability to control such these flows or sessions through specific bindings. This is carried out by creating flow specific bindings or filters associated with a CoA at the HA. By applying at least some of the above-illustrated features, such as the embodiment of FIG. 6, the MN 10 may choose to adapt 330, 630 security mode of a specific binding. For instance, the MN 10 may send a specific binding update to the HA 30 activating security only for one of the bindings between the MN 10 and the HA 30 in the binding cache.

As an example, the MN 10 may have registered care-of-addresses COA1, COA2 and COA3 with the HA 30 and the home-address HoA1. The MN may choose to secure 330 traffic that is designated for the binding HoA1<->CoA2. The MN 10 sends a binding update to the HA 30 which activates security only for one of the bindings in the binding cache. Uplink and downlink user plane traffic for the link which corresponds to CoA2 is secured in this case. The MN 10 or HA 30 has the option of securing any one or all of the bindings associated with an HoA. In another example the MN 10 has 3GPP and WLAN interfaces. The MN 10 may register a CoA from both interfaces, but negotiate user plane security only for the WLAN interface.

Thus, resource usage both in the MN 10 and the HA 30 can be further optimized, since unnecessary security associations can be avoided for secure accesses. If user plane security negotiation would not take each CoA into account, and the MN 10 would have multitude of interfaces, there would be a multitude of security associations as well, which would be unnecessary burden especially for the HA 30.

Thus, there may be different security levels for different IP flows of the MN 10 within the IP sub-network 40. For instance, some IP flows within the IP sub-network 40 may be encrypted, while others are not. This may be based on the nature of the IP flows. For instance, an IP flow used for web browsing is not encrypted, but in response to (establishing a new IP flow or using an existing IP flow for) connecting to a secure email, encryption is set on between the MN 10 and the HA 30. Another example could be voice over IP (VoIP), or other services a HA 30 operator wants to secure. For instance, the operator may wish to provide security for VoIP, but not for other flows.

In a still further embodiment, the steps 320 and 330 are carried out in response to a user input via the user interface 240. A user may configure the MN 10 that all user plane traffic needs to be secured. This may in case the user is roaming in countries or networks that may be viewed by the user as being unreliable. A user of the home agent 30 apparatus may be provided with access to triggering security mode adaptation. The user interface 240 of the mobile node 10 apparatus and/or the home agent 30 apparatus may also provide an access to change settings controlling one or more of the other presently disclosed embodiments. For instance, an authorized cellular operator's employee may configure security modes associated with access networks or locations.

As already indicated, in some embodiments the procedures illustrated in FIGS. 3 to 6 above are applied in the mobile node 10 and/or the home agent 30. Let us now study some further embodiments related to implementing the security mode adaptation related features in the mobile node 10 and/or the home agent 30.

Regardless of whether the MN 10 or the HA 30 is configured to initially decide to change the security mode for the MN 10 connected to the IP sub-network 40, there needs to be a signalling mechanism to inform the other party (HA 30 or MN 10) of the change. Hence, the apparatus 200 performing the decision to change the security mode may be arranged to perform a subsequent step after step 330 to indicate the need to change the security mode. The procedures of FIG. 3 may be applied also in the device receiving such indication, which may be considered as the trigger for step 320. Such received indication will override any policy stored on the device or earlier provided by the policy server 70.

Already existing IP mobility signalling messages or new signalling messages may be applied for indicating at least the need to change the security mode. Some further embodiments are illustrated below.

In some embodiments the MN 10 initially decides to adapt 330 the security mode, for instance by applying some of the embodiments illustrated above. Thus, the MN 10 may send a specific registration update or binding update message including an indication of the applied security mode or need to change the security mode.

Figure 7:
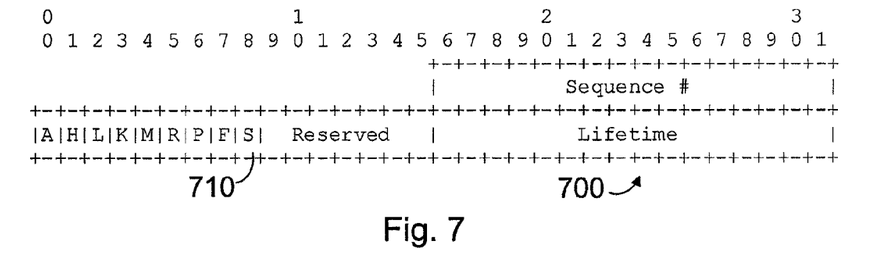
FIGS. 7 to 10 illustrate Mobile IP messages according to some embodiments.

In one example for MIP6, the MN 10 sends a binding update with a flag set indicating that the user plane traffic will or will not be encrypted. As illustrated in the example of FIG. 7, a binding update message 700 based on RFC 5555 or RFC 3775 may, in addition to conventional information, comprise a flag "S" 710, which could also be referred to as User Plane Traffic Security (UPTS) flag. When this flag is set on, this indicates that the MN prefers to turn on user plane encryption. When clear, the MN prefers not to use encryption for user plane traffic.

Figure 8:
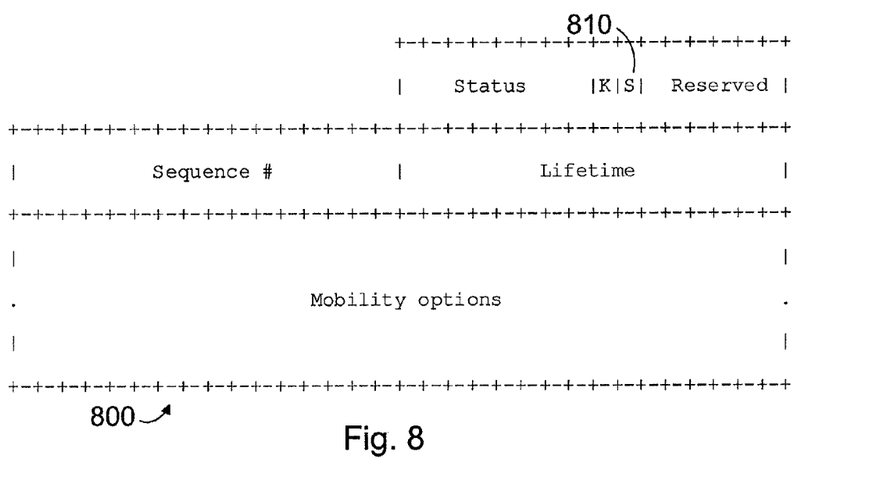

The HA 30 processes such registration request or binding update message from the MN 10 and may then send a response acknowledging the request and setting a flag in the response for user plane traffic security to correspondingly indicate to the MN that the traffic on the link between the MN and HA will or will not be encrypted. As illustrated in the example of FIG. 8, a MIP6 binding acknowledgement message 800 based on RFC 3775 or Binding Acknowledgement extensions based on RFC 5555 may additionally comprise a flag "S" 810. When this flag is set, this indicates that the HA acknowledges or strongly recommends use of user plane encryption. When clear, the HA does not support or allow user plane traffic encryption.

Figure 11:
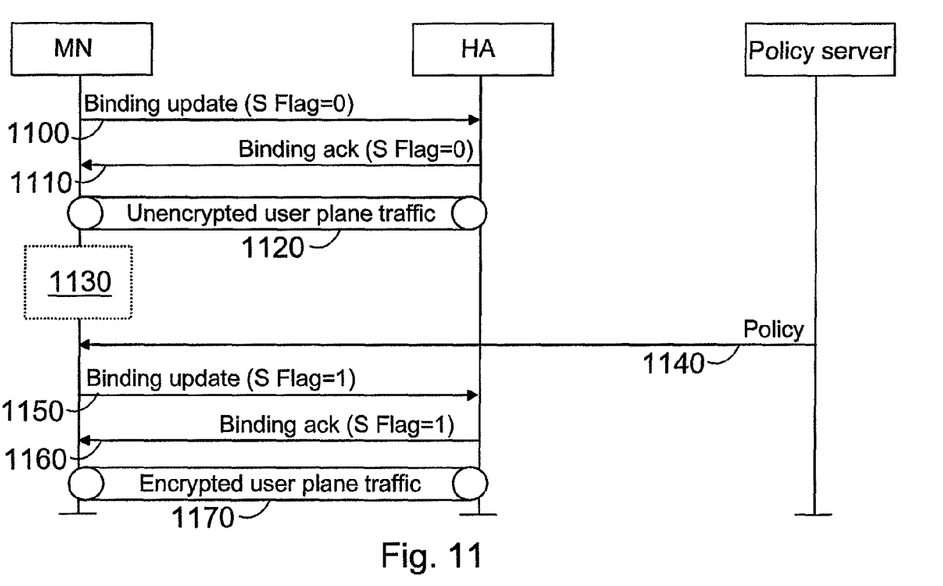
FIGS. 11 to 13 illustrate signaling charts according to some embodiments.
Figure 12:
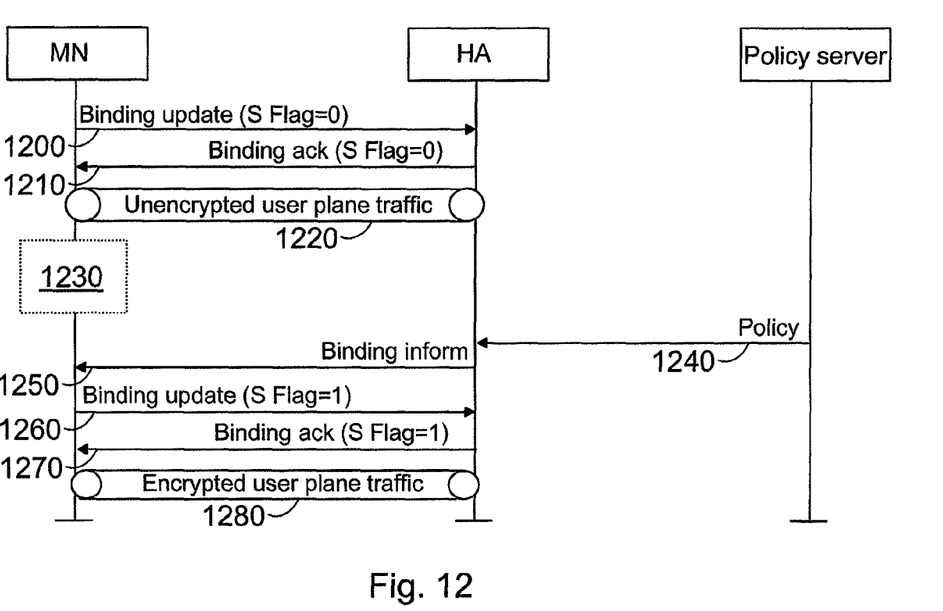

Reference is also made to FIGS. 11 and 12, references 1100 to 1120 and 1200 to 1220, respectively, illustrating use of such modified binding update and acknowledgement messages 700, 800 to set encryption off. References 1150 to 1170 and 1250 to 1280 illustrate how such modified binding update and acknowledgement messages 700, 800 to establish a tunnel 1170, 1280 with user plane traffic being encrypted.

With reference to the second embodiment illustrated in FIG. 5, the MN 10 may include location information in IP mobility signalling message, such as in a modified MIP6 binding update message. The HA 30 can determine from the location information and/or the source address of the binding update, for instance, if the security mode for the user plane traffic needs to be adapted.

Figure 9:
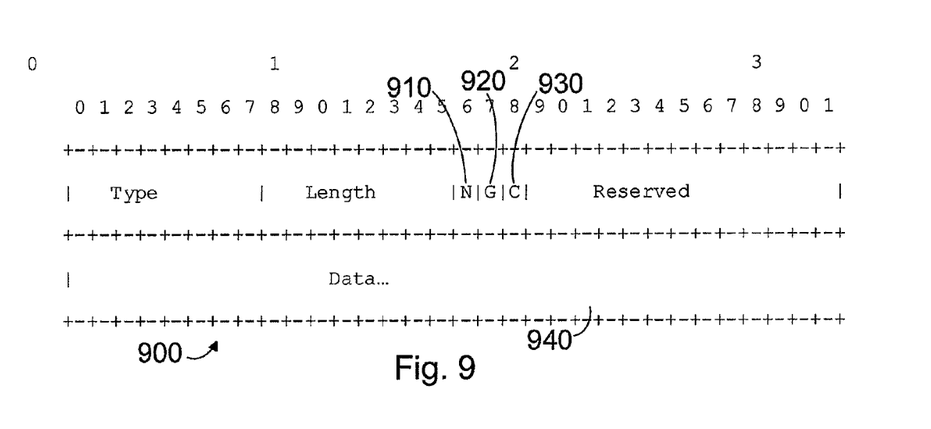

This can be realized by a new extension to IP mobility signalling message, one example of such extension for MIP6 binding update message 900 being illustrated in FIG. 9. In this example the flags may be defined as follows: N 910 indicates that network access point information is included, G 920 indicates presence of geolocation information, and C 930 indicates presence of civic location information. The data field 940 could, for example be defined as follows: If the flag N 910 is set, this field may include access network related identification information, such as a cell identifier. In another example the data field 940 may include a string with access type, operator and access point name (APN) or SSID, for instance "3GPP:Elisa:Internet" or "WLAN:unknown:FREE-HOTSPOT". If the flag G 920 is set, the data field may include geolocation information as described in RFC5491, for instance. If the flag C 930 is set, the data field 940 may include civic location information as described in RFC4776, for instance. Multiple instances of this extension can exist in a single binding update message if there is a need to communicate different types of location information.

In some embodiments the HA 30 decides to adapt 330 the security mode, for instance by applying some of the embodiments illustrated above. Thus, since this typically occurs outside a registration or binding update procedure, the HA 30 uses a new or some existing IP mobility signalling message to indicate the MN 10 of the need to adapt the security mode or trigger a registration or binding update procedure to negotiate on the adaptation of the security mode.

Figure 10:
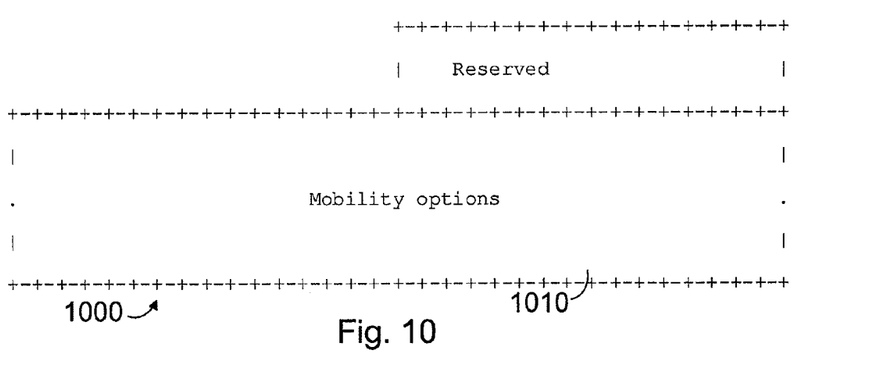

In one embodiment a new Mobile IP binding inform message has been developed. An example of such message 1000 is illustrated in FIG. 10. The binding inform message is a signalling message and may have the same security requirements as any other mobile IPv6 signalling message. The MN 10 may be arranged to trigger a binding update procedure in response to receiving the binding inform message. The Mobility Options field 1010 may be a variable-length field including data controlling the MN 10 to trigger the binding update procedure. The Mobility Options field 1010 may be formed in accordance with Section 6.2 of the RFC 3775. In one example, in addition to Type and Length fields, there could be an Inform Code field and an Inform Reason field. The Inform code could indicate a Trigger Binding Update, and the Inform Reason Field could indicate a Security Mode change.

It is to be noted that the use of such binding inform message is not limited to the present security mode adaptation features, but such message may be applied for other purposes and usage contexts.

In some embodiments a policy server 70 is applied to provide information assisting the MN 10 and/or the HA 30 to detect 320 the need for adapt the security mode. The policy server 70 may determine the required security level or security mode between the MN 10 and the HA 30. Such policy server may be an AAA server or ANDSF server, for instance. This information assists the MN 10 or the HA 30 in determining the required mobile IP security mode between the MN and HA may be determined at the time of network attachment.

FIG. 11 further illustrates an embodiment in which the policy server 70 sends a security policy 1140 in connection with a change 1130 of network attachment point regarding the mobile node MN 10. The security policy indicates if a current access network is trusted or untrusted. The policy is typically sent in connection with network attachment, but could also happen in response to some other change in the mobile node's 10 operating environment.

On the basis of this indication 1140 from the policy server, the MN 10 determines 310 a required security mode between the MN 10 and the HA 30. Then, in response to detecting a need to change the security mode, the MN 10 sends a binding update signalling message to the HA 30 indicating if user plane encryption is to be used or not, on the basis of the policy received from the policy server. The HA 30 sets the security mode for user plane traffic on the basis of the indication in the received binding update message 1150. The HA sends a binding acknowledgement 1160 to the MN. The binding acknowledgement may include an indication of the security mode applied, such as indication of the application of encryption. In the example of FIG. 11, encryption is set on. Then, the MN 10 and the HA 30 may start to send and receive user-plane traffic as encrypted in accordance with the security mode determined on the basis of policy sent by the policy server 70.

In another embodiment, as illustrated in FIG. 12, there is an interface between the policy server and the HA 30, which is used to send a policy to the HA. For instance, the policy server may send the policy in response to the MN 10 attaching a new access network. It is also possible that the policy server sends a policy update to the HA 30 to indicate a new security level required for the MN 10. This may occur in connection with one of the situations illustrated in FIGS. 4 to 6, for instance. In response to receiving the policy (update), from the policy server, the HA 30 determines the required security mode in accordance with the policy (update) from the policy server. The HA 30 then informs the MN 10 about the security mode change, if necessary. In the example of FIG. 12, encryption is set on.

The mobile node 10 may be arranged to provide information about its current location to a correspondent node 80. At least some of the presently disclosed security mode adaptation related features may be applied for setting a security mode between a mobile node and a correspondent node, such as the CN 80.

Figure 13:
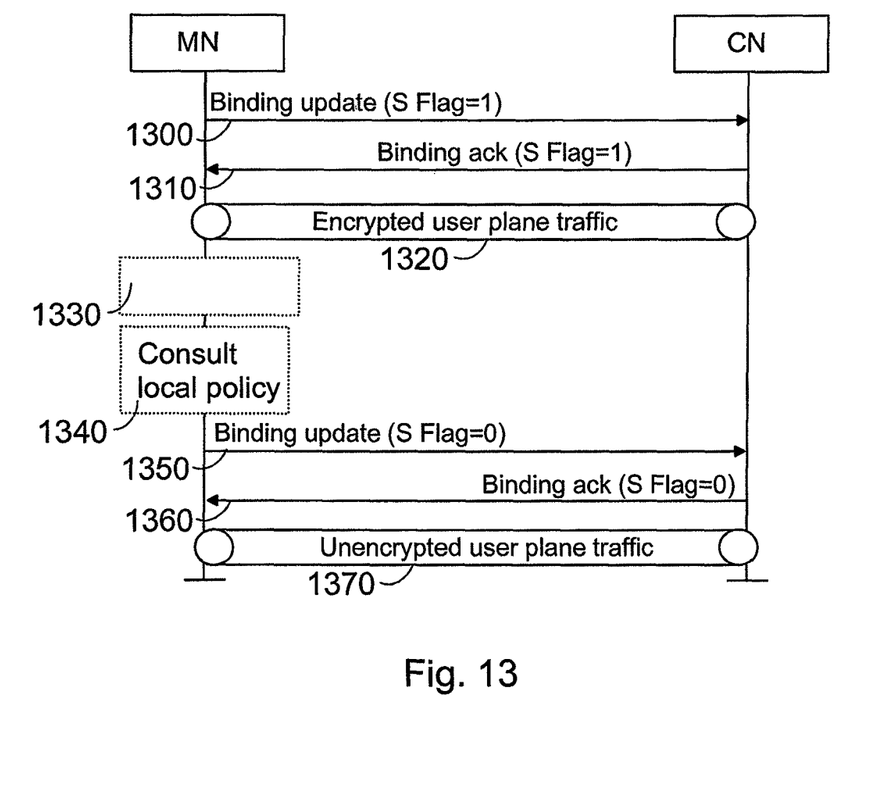

FIG. 13 illustrates an example of communication between the MN 10 and the CN 80 for updating mobility binding. In order to communicate directly with the CN 80, the MN 10 can issue 1300 a binding update to the CN. Similarly as already illustrated for the HA 30, the MN 10 may set the security mode indication, the S flag, on or off. In the example of FIG. 13, the MN 10 decides that encryption is required, and the S flag is 1. The CN sends an acknowledgement 1310 acknowledging also the setting of the encryption on for the mobility binding. Then, both the MN 10 and the CN 80 are arranged to encrypt the user plane traffic 1320.

It is to be noted that, similarly as for a binding acknowledgement from the HA 30, the CN 80 could set the S flag as 1 in the acknowledgment 1310 to indicate that it prefers the communication be encrypted. However, it is preferable that the CN 80 is not able to force encryption on in this manner.

In step 1330 an event, such as a change of access point (410), a change of the position of the MN 10 (510), or a need to establish or modify an IP flow (610), occurs. The MN 10 checks 1340 a locally stored policy, for instance a policy stored in the memory 230. On the basis of the locally consulted policy, the MN 10 may detect a need to adapt the security mode earlier agreed in connection with the Mobile IP CoA registration procedure 1300, 1310. It is to be noted that the consultation of the locally stored policy may be applied in connection with the above identified embodiments for the security mode between the MN 10 and home agent 30.

In the example of FIG. 13, on the basis of the security policy it is not necessary to apply encryption, so the MN 10 forms and sends 1350 a binding update with S flag "0". The CN 80 sends a binding acknowledgment 1360 with a confirmation of the new security mode, and the user plane traffic between the MN and the CN may be transferred 1370 unencrypted.

In one embodiment at least some of the IPsec procedures may be used for securing the user plane traffic when the security between the MN and HA is based on IPsec. Thus, the MN 10 and the HA 30 comprise IPSec protocol entities. The user plane traffic between the MN 10 and HA 30 may be secured via an IPsec security association (SA) which is established between them for protecting user plane data. Depending on the security mode being defined in step 320, the IPSec functionality of the MN 10 and the HA 30 may be arranged to use Encapsulating Security Payload (ESP) protection to secure the traffic between the HA 30 and the MN 10.

However, security between the MN and HA could also be arranged by another protocol, such as the Transport Layer Security (TLS), the Internet Key Exchange version 2 Mobility and Multihoming Protocol (MOBIKE), or the secure HTTP (HTTPS).

It is to be noted that the above features represent only some examples of available ways to implement the present features related to arranging an adaptive service. For instance, a proxy network node or agent in the network 22 may be arranged to perform signalling with the home agent 30 and carry out at least some of the above-illustrated features on behalf of the mobile node 10 attached to the network. Various modifications can be made and some of the steps may be carried out in a different order.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   causing establishment of an internet protocol (IP) mobility binding with an indication of a security mode for a mobile node connected to an IP sub-network and identified in the IP sub-network by a care of address,
   detecting a trigger to adapt the security mode for the mobile node connected to the IP sub-network, wherein there is no update to the IP mobility binding and the care of address, and wherein the mobile node continues to be connected to the IP sub-network and continues to be identified in the IP sub-network by the same care of address,
   adapting, in response to the trigger, the security mode for the mobile node connected to the IP sub-network and identified by the care of address; and
   causing a binding update message to be transmitted to indicate an applied security mode or a need to change the security mode, wherein the binding update message is associated with a flag that is indicative of whether user plane traffic will be encrypted or unencrypted.

2. The method of claim 1, wherein detecting a trigger comprises detecting movement of the mobile node to a new access network or node inside the IP sub-network by applying a data link layer mobility protocol.

3. The method of claim 1, wherein detecting a trigger comprises detecting movement of the mobile node to a geographical location associated with security requirements requiring adaptation of the security mode.

4. The method of claim 1, wherein detecting a trigger comprises detecting a need to establish a new IP flow with a different security mode or to modify the security mode of an existing IP flow for the mobile node.

5. The method of claim 1, wherein an indication of the required security level is received from a policy server, and the security mode is adapted in accordance with the indication of the security level.

6. The method of claim 1, wherein adapting the security mode comprises re-negotiating or establishing an Internet protocol security architecture security association or a transport layer security connection to enable encryption of user plane traffic associated with the mobile node.

7. The method of claim 1, wherein causing establishment of an IP mobility binding, detecting a trigger and adapting the security mode are carried out by the mobile node to modify the security mode between the mobile node and a mobility anchor or a correspondent node without changing the care of address.

8. The method of claim 7, wherein detecting a trigger comprises detecting a Mobile IP binding signalling message received from a home agent and with an indication to trigger an update to the Mobile IP binding, wherein the Mobile IP binding signaling message comprises an indication of a user plane encryption.

9. The method of claim 1, wherein causing establishment of an IP mobility binding, detecting a trigger and adapting the security mode are carried out by a mobile IP home agent to modify the security mode between the home agent and the mobile node without changing the care of address.

10. The method of claim 1, wherein causing establishment of an internet protocol (IP) mobility binding further comprises a Mobile IP binding signalling message from the mobile node comprising at least one of information on location of the mobile node, information of new access point or network of the mobile node within the IP sub-network, and an indication of a security mode to be applied for the mobile node.

11. The method of claim 1, wherein causing establishment of an IP mobility binding, detecting a trigger and adapting the security mode are carried out by a correspondent node in response to a binding update message from the mobile node.

12. An apparatus comprising: at least one processor, and at least one memory comprising computer program code, wherein the at least one memory and the computer program code are configured, with the at least one processor of the apparatus, to cause the apparatus at least to:
   cause establishment of an internet protocol (IP) mobility binding with an indication of a security mode for a mobile node connected to an IP sub-network and identified in the IP sub-network by a care of address,
   detect a trigger to adapt the security mode for the mobile node connected to the IP sub-network, wherein there is no update to the IP mobility binding and the care of address, and wherein the mobile node continues to be connected to the IP sub-network and continues to be identified in the IP sub-network by the same care of address,
   adapt, in response to the trigger, the security mode for the mobile node connected to the IP sub-network and identified by the care of address; and
   cause a binding update message to be transmitted to indicate an applied security mode or a need to change the security mode, wherein the binding update message is associated with a flag that is indicative of whether user plane traffic will be encrypted or unencrypted.

13. The apparatus of claim 12, wherein the apparatus is configured to adapt the security mode in response to detecting movement of the mobile node to a new access network or node inside the IP sub-network by applying a data link layer mobility protocol.

14. The apparatus of claim 12, wherein the apparatus is configured to adapt the security mode in response to detecting movement of the mobile node to a geographical location associated with security requirements requiring adaptation of the security mode.

15. The apparatus of claim 12, wherein the apparatus is configured to adapt the security mode in response to detecting a need to establish a new IP flow or to modify an existing IP flow for the mobile node.

16. The apparatus of claim 12, wherein the apparatus is configured to adapt the security mode in accordance with an indication of the required security level from a policy server.

17. The apparatus of claim 12, wherein the apparatus is configured to adapt the security mode by re-negotiating or establishing an Internet protocol security architecture security association or a transport layer security connection to enable encryption of user plane traffic associated with the mobile node.

18. The apparatus of claim 12, wherein the apparatus is a mobile communications terminal device embodying the mobile node configured to register the care of address to a Mobile IP home agent or a correspondent node and configured to modify the security mode between the mobile node and a mobility anchor or a correspondent node without changing the care of address without changing the care of address.

19. The apparatus of claim 18, wherein the apparatus is configured to adapt the security mode in response to a Mobile IP binding signalling message with an indication to trigger an update to the Mobile IP binding from the home agent, or to send a binding update message in response to the Mobile IP signalling message, wherein the Mobile IP binding signaling message comprises an indication of a user plane encryption.

20. The apparatus of claim 12, wherein the apparatus embodies a Mobile IP home agent.

21. The apparatus of claim 12, wherein causing establishment of an internet protocol (IP) mobility binding further comprises a Mobile IP binding signalling message from the mobile node comprising at least one of information on location of the mobile node, information of new access point or network of the mobile node within the IP sub-network, and an indication of security mode to be applied between the home agent and the mobile node.

22. The apparatus of claim 12, wherein the apparatus embodies a correspondent node configured to adapt the security mode in response to a binding update message from the mobile node.

23. A non-transitory computer-readable storage medium storing a computer program comprising one or more sequences of one or more instructions which, when executed by one or more processors of the apparatus, cause the apparatus to at least:

cause establishment of an internet protocol (IP) mobility binding with an indication of a security mode for a mobile node connected to an IP sub-network and identified in the IP sub-network by a care of address, detect a trigger to adapt the security mode for the mobile node connected to the IP sub-network, wherein there is no update to the IP mobility binding and the care of address, and wherein the mobile node continues to be connected to the IP sub-network and continues to be identified in the IP sub-network by the same care of address, adapt, in response to the trigger, the security mode for the mobile node connected to the IP sub-network and identified by the care of address; and cause a binding update message to be transmitted to indicate an applied security mode or a need to change the security mode, wherein the binding update message is associated with a flag that is indicative of whether user plane traffic will be encrypted or unencrypted.

\* \* \* \* \*